July 12, 1932. B. BAUER 1,866,875

VENTILATION AND CONSTRUCTION OF DYE WORKS

Filed June 17, 1930 2 Sheets-Sheet 1

Bruno Bauer
INVENTOR.
By
his Attorney

July 12, 1932.  B. BAUER  1,866,875

VENTILATION AND CONSTRUCTION OF DYE WORKS

Filed June 17, 1930　　2 Sheets-Sheet 2

Bruno Bauer
INVENTOR·
By
his Attorney

Patented July 12, 1932

1,866,875

UNITED STATES PATENT OFFICE

BRUNO BAUER, OF VIENNA, AUSTRIA

VENTILATION AND CONSTRUCTION OF DYE WORKS

Application filed June 17, 1930, Serial No. 461,668, and in Austria July 20, 1929.

It has already been proposed to disperse mist and fog caused by the generation of steam in factory workshops, such, for instance, as dye works by the induction of preheated air into the workshops. But the method of introducing this air by means of metal pipes or channels built in the roofing restricts the entrance of light into the workshop very considerably, especially if the roof surfaces are constructed with a steep slope in order to allow the condensed steam to flow away.

According to the present invention the parts of the ceiling or roof serving to admit light are constructed so that they may be used for the induction and distribution of the heated air.

Manners of carrying the invention into effect are shown diagrammatically in the accompanying drawing by way of example.

Figure 1:
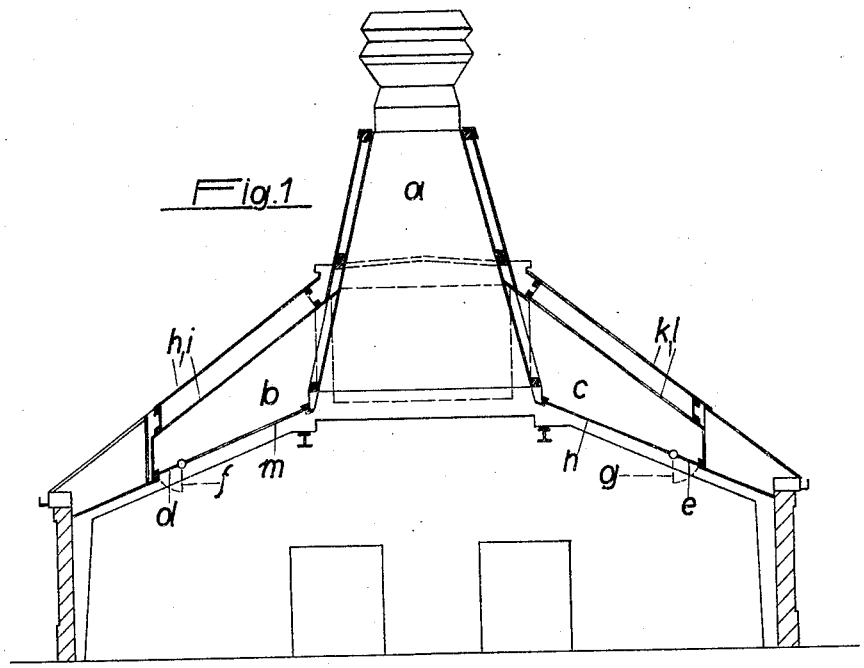
Figure 1 is a cross sectional view of a building wherein heated air is induced at both sides of the vapour flue.

In the manner of carrying out the invention shown in Figure 1, chambers, $b$, $c$ for the induction of heated air are constructed on both sides of the flue $a$, said chambers being provided on the lower side with openings $d$, $e$ adapted to be adjustably closed by means of flaps $f$, $g$. The air induction chambers are insulated from the outer air by two superimposed glass walls, $h$, $i$ and $k$, $l$. The lower boundary wall $m$ or $n$ is also of glass.

Figure 2:
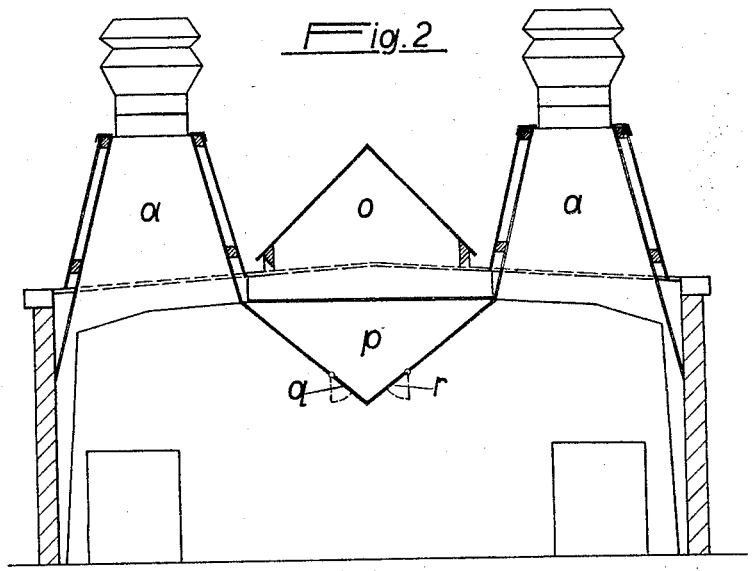
Figure 2 is a cross sectional view of a building wherein the air is induced between two vapour flues.

In the manner of carrying the invention into effect according to Figure 2, a sky light $o$, covered by a glass roof, is arranged between two vapour flues $a$, $a$, whilst the lower portion $p$, also enclosed by glass on all sides, is used for introducing the warm air for dispersing mist, and is provided with inlets $q$, $r$, adapted to be closed by flaps.

Figure 3:
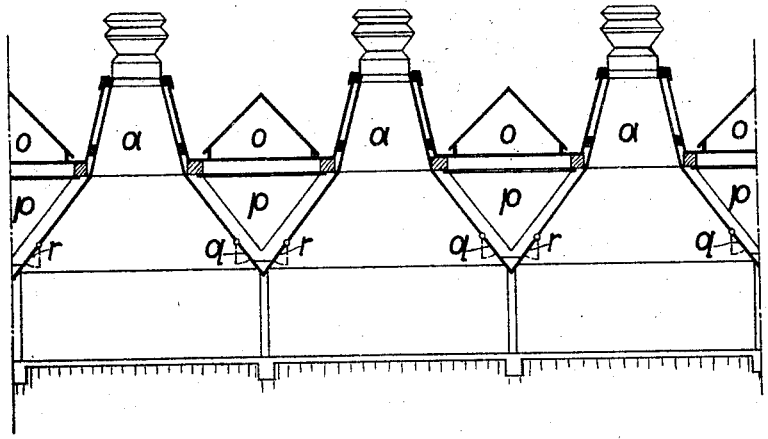
Figure 3 is a sectional view of a shed wherein cowls for the induction of preheated air are arranged between every two vapour flues.

The manner of carrying out the invention according to Figure 3, is substantially the same as that shown in Figure 2, except that when building the roof of a shed several vapour flues are constructed with intermediate cowls.

As according to the invention the whole ceiling is brought to a higher temperature by the preheated air, the formation of mist and fog is much more effectively avoided than is possible by the known devices.

I claim:—

1. In a building construction for dispersing fog having a glass roof, the combination therewith of hot air conduits each thereof comprising a glass bottom wall spaced from the roof, side walls disposed between the bottom walls and a space short of the roof, a glass plate superimposed on said side walls and forming an insulating space under the roof, outlet members adjustable in the bottom wall to admit hot air to the interior of the building, and vents open to the interior of the building for communication with the outside of the building.

2. In a building construction for dispersing fog having a glass roof, the combination therewith of hot air conduits, each thereof comprising a glass bottom wall spaced from the roof, side walls disposed between the bottom walls and a space short of the roof, a glass plate superimposed on said side walls and forming an insulating space under the roof, and outlet members adjustable in the bottom wall to admit hot air to the interior of the building.

In testimony whereof I affix my signature.

DR. BRUNO BAUER.